3,343,122
JUNCTION DEVICE FOR ELECTRIC CABLE OF THE COAXIAL TYPE, MORE PARTICULARLY FOR HIGH-TENSION COAXIAL CABLE
Pierre Louis Marie Drogo, 104 Rue Garibaldi, St. Maur, France
Filed Apr. 26, 1965, Ser. No. 450,708
Claims priority, application France, Apr. 25, 1964, 972,369, Patent 1,404,498
2 Claims. (Cl. 339—177)

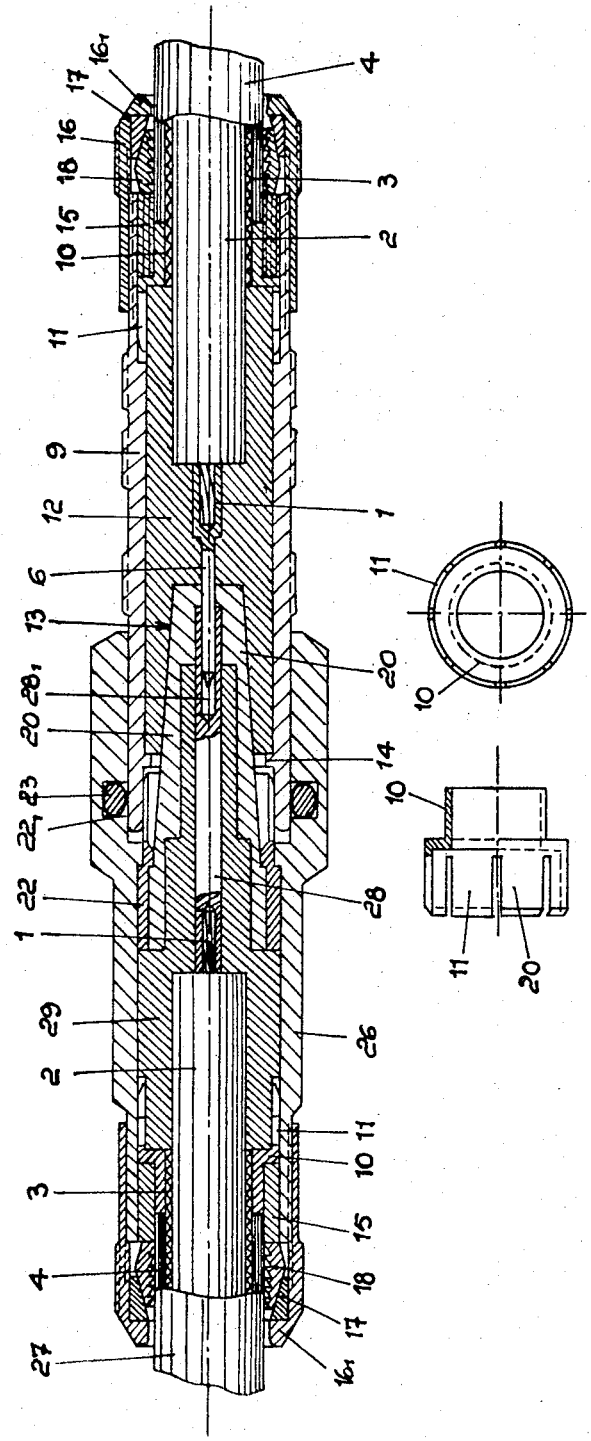

One of the objects of the invention is to produce a junction device for electric cables, more particularly for high-tension coaxial cable in which the junction takes place in good conditions of insulation and tightness and with conductivity conditions appreciably identical to those of the cable utilized.

Another object of the invention is to produce a device in which the mounting of the various constituent elements is easy.

Another object of the invention is to produce a junction device in which air is prevented from penetrating between the contact surfaces.

Other objects and advantages of the invention will be revealed by the description and claims hereafter, as well as the attached drawings, in which:

FIGURE 2 shows, in longitudinal section, a junction device according to the invention, applied to the junction of two coaxial cables;

FIGURE 3 shows a partial section of a method of embodiment of an elastic ring placed in the junction device;

FIGURE 4 is a left-hand view of FIGURE 1.

Figure 1:
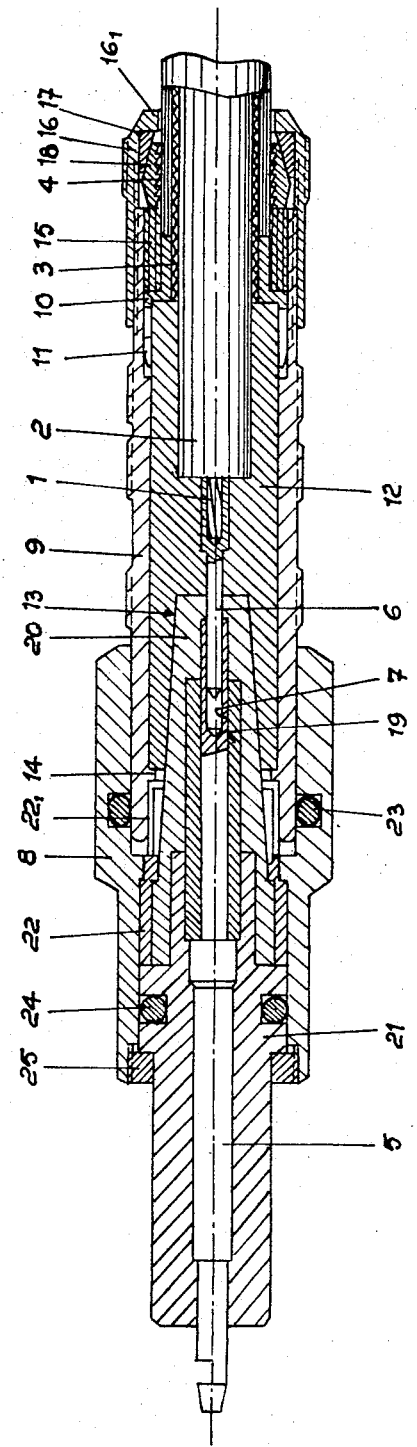
FIGURE 1 shows, in longitudinal section, a junction device according to the invention, applied to the junction of a coaxial cable at a terminal.

The present device is intended to connect a coaxial cable, either to an insulated terminal or base (FIGURE 1) or to another coaxial cable (FIGURE 2) while retaining in the connection system, conditions of insulation and conductivity appreciably identical to those of cables utilized.

In the case of the connection of a high-tension coaxial cable to an insulated terminal or base (see FIGURE 1), the coaxial cable comprises a central conductor 1 surrounded by a dielectric 2 which is itself covered by a metal sheath 3 and the whole enclosed in an insulating sheath 4.

The central conductor 1 of the cable is intended to be connected to a conducting part 5 formed by the insulated terminal.

After having prepared the coaxial cable, the contact 6 made under the form of a rod, is attached by soldering or crimping to the central conductor 1 of the cable, this rod 6 being intended to penetrate into a housing of corresponding shape 7 made in the end of the insulated terminal 5 of the base.

The insulated terminal is placed inside a conducting casing 8 whereas the coaxial cable is placed inside a conducting casing 9.

On the external conducting sheath 3 of the coaxial cable, there is also attached, by soldering, crimping or the like, a ring 10 provided with an annular extension made in the shape of a tongue 11 (see FIGURES 3 and 4).

These tongues which possess a certain amount of elasticity, are intended to be applied on the internal wall of the conducting casing 9, so as electrically to connect the metal sheath 3 of the coaxial cable to the casing 9, then to the casing 8 of the base.

The coaxial cable provided with the rod 6 and ring 10, is inserted in the insulating unit 12 formed by an insulating material having a certain degree of elasticity.

This unit 12 comprises a housing 13 at its free end of tapered or cylindro-conical shape intended to accommodate the male part of the insulation of the base.

This insulating unit 12 is thus encased on the cable, so as to surround the part of the dielectric 2 which has been bared and part of the rod 6. The internal diameters of the housings of the insulating unit 12 intended to accommodate the coaxial cable, are equal to or less, according to the insulating material utilized, than the corresponding diameters of the rod 6 and dielectric 2 of the cable so that the air is driven off, on the one hand, between the insulating unit 12 and the dielectric 2, and on the other hand, between the insulating unit 12 and the contact 6.

The assembly formed by the coaxial cable provided with parts 10 and 6 by the insulating unit 12, is inserted in the female casing 9 until the insulating unit 12 comes into contact with a stop 14 provided on the external wall of this casing 9.

During this insertion, the tongues 11 of the ring 10 slide in the corresponding housing of the casing 9 in order to set up a friction contact. Then an insulating ring 15 is fitted between the ring 10 and the internal wall of the casing 9, then on this mounting a plug is placed comprising a ring 16 provided with a collar inside $16_1$, an annular wedge-shaped element, a ring 18 split longitudinally and with sloping edges provided with notches on its internal wall.

The screwing of the ring 16 on to the external wall of the casing 9 brings the tapered ring 17 of the ring 18 closer, so as to anchor this ring on the external insulating sheath 4 of the coaxial cable.

It will thus be seen that the mounting of the coaxial cable enables electric continuity to be ensured between the sheath 3 and casing 9 by means of the part 10, while enabling mounting and dismantlying of this coaxial cable to be effected inside said casing.

As already mentioned, the fixed terminal or base, comprises a casing 8 inside which the terminal 5 is placed intended to accommodate the rod 6 at its end. This casing 8 is normally made of metal, but can also be made of different material.

The inside of the casing 8 accommodates an assembly of insulating parts, 19, 20 and 21. Inside this casing 8 there is also an annular ring 22 attached to the internal wall of the casing and comprising tongues $22_1$ intended to press on the internal wall of the casing 9, so as to ensure electric continuity between the two casings 8 and 9, in the event—of course—that the casing 9 is made of metal.

The parts 20 and 21 are made of a material with little or no elasticity, whereas the part 19 is made of a material with a certain amount of elasticity. This part 19 consists of a sleeve whose external diameter is slightly greater than the diameters of the cavities provided in the parts 20 and 21 for receiving it, so that the air is driven away from the contact surfaces of these elements.

For mounting this insulating terminal, the sleeve 19 is first of all placed around the conducting terminal 5, then the insulating part 21 is fitted on the terminal 5 and the sleeve, after which the unit 20 covers the front end of the terminal.

This unit 20 is made tapered so that it can be inserted in the housing 13 of the unit 12 and comprises a perforation at its end to enable the passage of the rod 6 which can thus penetrate into the housing 7 of the conducting terminal 5.

Toric tightness joints 23 and 24 can also be mounted, on the one hand, on the internal wall of the casing 8, and on the other, on the insulating part 21, in order to ensure the tightness of the junction devices.

The mounting of the various elements inside the casing 8 is held by an annular part 25 which screws on the inner wall of the casing 8, or by any other means.

In the case of making a junction of two coaxial cables (see FIGURE 2), the casing 9 comprises elements identical to those described in the example of embodiment of FIGURE 1 relating to the casing shown at 26, it also comprises a ring 10 just like the casing 9, in order to make the junction between the external conductor 3 of the cable 27 and this casing 26. This external ring is also preferably attached by soldering to the conductor 3.

The internal conductor 1 of this cable 27 receives a conducting part 28 provided with a cylindrical housing $28_1$ at its end, for accommodating the rod of the contact 6 by jointing.

The cable thus prepared is inserted in the part 29 made of material with a certain amount of elasticity so as to cover part of the part 28 soldered on the internal conductor 1, and the part of the dielectric 2 which has been bared.

The internal diameters of the cavities of this part 29 are equal to or less than the diameters of the dielectric 2 and the conducting part 28, so that the air is driven off entirely between this part 29, the rod 28 and the dielectric 2 of the cable.

The insulating part 29 and the end of the conducting part 28 are covered by the unit 20 which comprises a perforation at its end for the passage of the rod 6.

Moreover, the internal wall of the casing 26 accommodates a part 22 setting up the electric link between the casings 26 and 9, as well as the closing device comprising the parts 16, 17 and 18.

Obviously, the invention is not restricted to the examples of embodiment described and shown above, from which other alternatives can be provided without going outside of the scope of the invention for that purpose.

I claim:
1. In a device for making an electrical connection to the end of a coaxial cable including a central conductor covered by an insulating material and an outer conductive sheath, the combination including first and second terminal assemblies adapted to be connected to one another in air-free engagement, said first terminal assembly including a first central conductor rod joined to said central conductor, a first sleeve of insulating material around said conductor rod and a portion of the insulating material on said cable and a first casing sleeve of conducting material connected to said outer conducting sheath of said cable and around a portion of said first insulating sleeve, said second terminal assembly including a second conductor rod adapted to be connected with said first conductor rod, a second sleeve of insulating material around a portion of said second conductor rod and a third sleeve of insulating material around a portion of said second sleeve and said second conductor rod and including surfaces thereon adapted to contact surfaces on said first insulating sleeve in substantial air-free engagement, said first and second insulating sleeves being constructed of elastic insulating material, and said third sleeve being constructed of insulating material having substantially no elasticity.

2. The device of claim 1 wherein said contacting surfaces of said first and third insulating sleeves include mating frustoconical surfaces arranged in coaxial relation with said cable.

References Cited
UNITED STATES PATENTS

| | | | |
|---|---|---|---|
| 2,449,073 | 9/1948 | Johannesen | 339—177 X |
| 2,995,718 | 8/1961 | Murphy | 339—177 X |
| 3,051,925 | 8/1962 | Felts | 339—177 X |
| 3,054,981 | 9/1962 | Malek et al. | 339—177 |
| 3,076,169 | 1/1963 | Blaisdell | 339—177 X |
| 3,091,748 | 5/1963 | Takes et al. | 339—177 X |

MARVIN A. CHAMPION, *Primary Examiner.*

W. DONALD MILLER, *Examiner.*